United States Patent
Li (10) Patent No.: US 10,501,004 B2
(45) Date of Patent: Dec. 10, 2019

(54) CAR LIGHT SYSTEM AND MOTOR VEHICLE

(71) Applicant: BOE TECHNOLOGY GROUP CO., LTD., Beijing (CN)

(72) Inventor: Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 91 days.

(21) Appl. No.: 15/546,806

(22) PCT Filed: Jan. 17, 2017

(86) PCT No.: PCT/CN2017/071428
§ 371 (c)(1),
(2) Date: Jul. 27, 2017

(87) PCT Pub. No.: WO2017/185835
PCT Pub. Date: Nov. 2, 2017

(65) Prior Publication Data
US 2018/0222378 A1 Aug. 9, 2018

(30) Foreign Application Priority Data
Apr. 28, 2016 (CN) .......................... 2016 1 0279970

(51) Int. Cl.
*F21V 21/00* (2006.01)
*B60Q 1/04* (2006.01)
(Continued)

(52) U.S. Cl.
CPC .............. *B60Q 1/04* (2013.01); *B60Q 1/085* (2013.01); *B60Q 9/00* (2013.01); *F21S 41/645* (2018.01); *F21S 43/00* (2018.01); *G02B 3/14* (2013.01); *G02B 27/0955* (2013.01); *G03B 29/00* (2013.01); *B60Q 2400/50* (2013.01); *G02F 1/1334* (2013.01); *G03B 21/20* (2013.01)

(58) Field of Classification Search
CPC .................................................... B60Q 2400/50
USPC .................... 362/512, 520, 521, 522, 538
See application file for complete search history.

(56) References Cited

U.S. PATENT DOCUMENTS 5,438,486 A * 8/1995 McNair ............... B60Q 1/1415
362/512
5,672,001 A * 9/1997 Bertling ............... F21S 41/28
362/278
(Continued)

FOREIGN PATENT DOCUMENTS

CN 101218467 A 7/2008
CN 201582700 U 9/2010
(Continued)

OTHER PUBLICATIONS

International Search Report dated Apr. 17, 2017.
First Chinese Office Action dated Oct. 23, 2017.

*Primary Examiner* — Laura K Tso
(74) *Attorney, Agent, or Firm* — Dilworth & Barrese, LLP; Michael J. Musella, Esq.

(57) ABSTRACT

A car light system and a motor vehicle include an illuminating lamp configured to emit illuminating ray; a projection lamp configured to project received information to be projected onto a projection medium; and a control module configured to provide the information to be projected and turn on and off the illuminating lamp and the projection lamp.

8 Claims, 6 Drawing Sheets

(51) Int. Cl.
    *F21S 43/00*     (2018.01)
    *G02B 27/09*     (2006.01)
    *G02B 3/14*     (2006.01)
    *G03B 29/00*     (2006.01)
    *B60Q 1/08*     (2006.01)
    *B60Q 9/00*     (2006.01)
    *F21S 41/64*     (2018.01)
    *G02F 1/1334*     (2006.01)
    *G03B 21/20*     (2006.01)

(56) References Cited

U.S. PATENT DOCUMENTS

| | | | |
|---|---|---|---|
| 8,757,853 B2 * | 6/2014 | Robert | B60Q 1/12 |
| | | | 362/464 |
| 9,164,202 B2 * | 10/2015 | Batchko | G02B 3/12 |
| 2009/0116259 A1 * | 5/2009 | Ohshio | F21S 41/698 |
| | | | 362/512 |
| 2011/0013412 A1 * | 1/2011 | Kobayashi | F21S 41/645 |
| | | | 362/538 |
| 2011/0280032 A1 * | 11/2011 | Kishimoto | B82Y 20/00 |
| | | | 362/538 |
| 2013/0314937 A1 | 11/2013 | Takahashi et al. | |
| 2014/0268837 A1 * | 9/2014 | Simchak | B60Q 1/12 |
| | | | 362/465 |
| 2015/0009693 A1 | 1/2015 | Sekiguchi et al. | |
| 2015/0377445 A1 | 12/2015 | Chuang | |
| 2018/0272929 A1 * | 9/2018 | Krahnstover | B60Q 1/525 |

FOREIGN PATENT DOCUMENTS

| | | |
|---|---|---|
| CN | 201983155 U | 9/2011 |
| CN | 102434834 A | 5/2012 |
| CN | 702745152 A | 10/2012 |
| CN | 104344299 A | 2/2015 |
| CN | 204659569 U | 9/2015 |
| CN | 105202444 A | 12/2015 |
| CN | 105805670 A | 7/2016 |
| CN | 205535482 U | 8/2016 |

* cited by examiner

CAR LIGHT SYSTEM AND MOTOR VEHICLE

TECHNICAL FIELD

The present disclosure relates to a car light system and a motor vehicle.

BACKGROUND

Motor vehicle has increasingly become an essential vehicle for human travel. A navigation device is usually arranged in the motor vehicle to assist the driver in reaching the destination more quickly. The navigation device is usually disposed below the driver's line of sight. In use, the driver often needs to look down to get navigation information. The navigation device affects the safety of driving.

SUMMARY

At least one embodiment of the present disclosure relates to a car light system and a motor vehicle. The car light system can project information to be projected onto a projection medium, and hence improves the driving safety of motor vehicles.

One aspect of the disclosure provides a car light system, comprising: an illuminating lamp configured to emit illuminating ray; a projection lamp configured to project received information to be projected onto a projection medium; and a control module configured to provide the information to be projected and turn on and off the illuminating lamp and the projection lamp.

In one example, the car light system further comprises a lampshade, wherein the illuminating lamp and the projection lamp are disposed in the lampshade.

In one example, the projection lamp is rotatably arranged in the lampshade.

In one example, the illuminating lamp includes a light-emitting part; and a light adjuster is disposed on a light-emitting side of the light-emitting part and configured to adjust a direction of light emitted by the light-emitting part.

In one example, the light adjuster is configured to switch between a first state and a second state; in the first state, the light adjuster is configured to diverge the light emitted by the light-emitting part; and in the second state, the light emitted by the light-emitting part has unchanged direction upon running through the light adjuster.

In one example, the light adjuster is connected to the control module; and the control module controls the light adjuster to switch between the first state and the second state.

In one example, the light adjuster is a polymeric dispersion liquid crystal device or a multistable liquid crystal device.

In one example, the light adjuster is an adjustable lens; and the adjustable lens includes three states of planar state, concave state and convex state, so as to transmit, diverge and focus the light emitted by the light-emitting part.

In one example, the projection medium is the ground.

In one example, the control module integrates a navigation function; and navigation information is projected onto the projection medium through the projection lamp.

In one example, the control module integrates a playback function of videos, audios and images; and the videos and the images are projected onto the projection medium through the projection lamp.

In one example, the control module includes an interface which is configured to connect an information source to be projected.

Another aspect of the disclosure provides a motor vehicle, comprising the car light system as mentioned above.

In one example, the motor vehicle further comprises a recess disposed at a head position, a receiving screen matched with the recess, and an pop-up reset mechanism, wherein the pop-up reset mechanism is configured to pop up and reset the receiving screen; in a case of pop-up, the receiving screen is disposed at a position facing the light-emitting part of the projection lamp on the front of the motor vehicle; and in a case of reset, the receiving screen is retracted into the recess.

In one example, the receiving screen is just opposite to the projection lamp in the case of pop-up; and the projection lamp is configured to project information to be projected onto the receiving screen.

In one example, a distance between the projection lamp and the receiving screen is 2-5 m when the receiving screen is in the pop-up state.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

At present, motor vehicle has increasingly become an essential vehicle for human travel. With the rapid development of motor vehicle technology, various kinds of automobiles with unique functions emerge in an endless stream. But safety is always the most important consideration factor in the driving of motor vehicles. Most current motor vehicles, for instance, automobiles, are equipped with navigation systems so as to reach the destination more conveniently. A navigation device is, for instance, usually displayed in the same display with videos and images. In addition, the display is usually disposed bellow the driver's line of sight. Thus, when the driver, for instance, needs to observe the display to acquire navigation information or other information, the driver needs to temporarily remove the line of sight away from the front of the automobile. Especially when the travelling speed of the automobile is very fast, the temporary removal of the driver's sight may also seriously affect the safe driving of the automobile. Therefore, a display system not affecting the safe driving of the motor vehicle is required to be designed to ensure the safe driving of the motor vehicle when the driver acquires, for instance, navigation information.

One aspect of the present disclosure provides a car light system, which comprises: an illuminating lamp configured to emit illuminating ray; a projection lamp configured to project received information to be projected onto a projection medium; and a control module configured to provide the information to be projected and turn on and off the illuminating lamp and the projection lamp. The present disclosure can project the information to be projected onto the projection medium by arrangement of the projection lamp in the car light system, and hence improves the driving safety of the motor vehicle.

Figure 1:
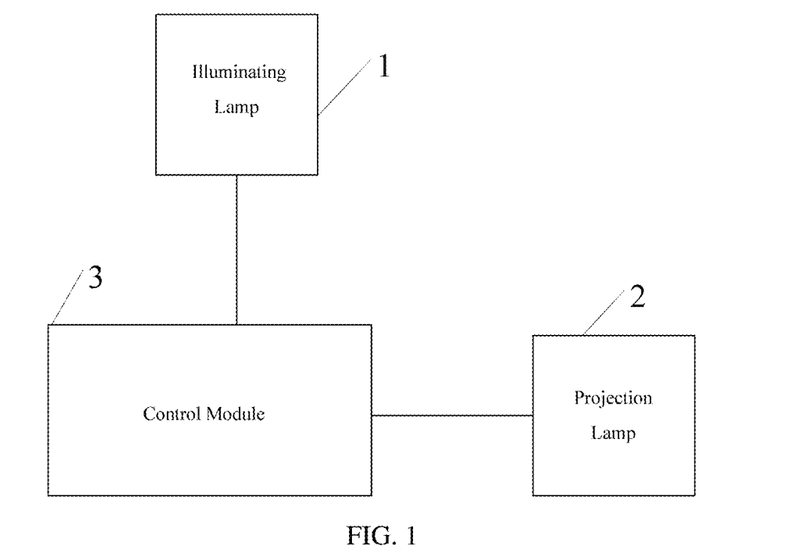
FIG. 1 is a schematic diagram of a car light system provided by the embodiment of the present disclosure.
Figure 1A:
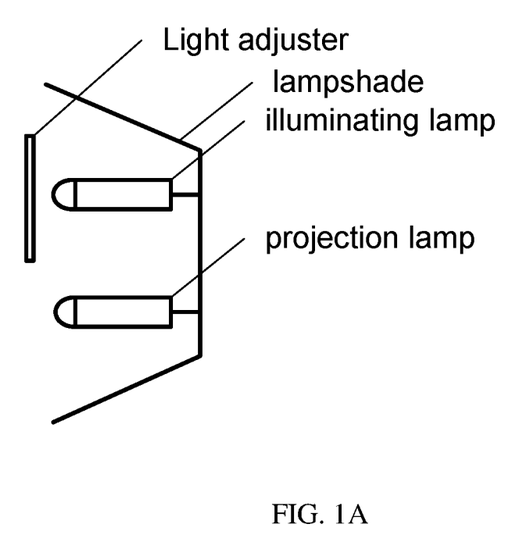
FIG. 1A is a schematic diagram of a car light system provided by the embodiment of the present disclosure.

FIG. 1 is a schematic diagram of a car light system provided by the embodiment of the present disclosure. As illustrated in FIG. 1, the car light system comprises an illuminating lamp 1, a projection lamp 2 and a control module 3. As described above, the illuminating lamp 1 is configured to emit illuminating ray; the projection lamp 2 is configured to project received information to be projected onto a projection medium; and the control module 3 is configured to provide the information to be projected and turn on and off the illuminating lamp 1 and the projection lamp 2. For instance, the control module 3 may be electrically connected with the illuminating lamp 1 and the projection lamp 2 to switch on and off the power supply on the illuminating lamp 1 and the projection lamp 2 and turn on and off the illuminating lamp 1 and the projection lamp 2. In addition, the control module 3 is also configured to provide the information to be projected to the projection lamp 2. For instance, the control module 3 may be connected with the projection lamp 2 through a data line, so as to transmit data relevant to the information to be projected to the projection lamp 2.

The function of the projection lamp is, for instance, similar to the function of a projection instrument, namely can give out the received information in the form of light and display the information at places irradiated by the light. The projection lamp and the illuminating lamp can be turned off when not required for use. The control module in the embodiment of the present disclosure has the function of turning on and off the illuminating lamp and the projection lamp. For instance, a switch may be disposed in the control module for the projection lamp and the illuminating lamp, respectively, and hence the switching of the projection lamp and the illuminating lamp can be controlled by the on/off of the switches. The switch may manually control the on/off and may also control the on/off by electromagnetic means (for instance, a magnetic coil is disposed near the switch, can apply an acting force to the switch in the case of energizing, and hence controls the on/off of the switch). For instance, the control module may also be provided with a power supply source. For instance, the power supply source may be dry batteries or rechargeable batteries. The power supply source turns on and off a power supply circuit through the switches, and hence controls the on/off states of the illuminating lamp and the projection lamp. For instance, the power supply source may also be disposed on the outside of the car light system. For instance, the power supply source is a battery of the motor vehicle.

Moreover, the control module may be equipped with a touch display. The display includes a touchable button. When the touchable button is pressed, corresponding operation information, for instance, electrical information for turning on or off the switch, is transmitted to the switch. For instance, the switch executes on and off operations corresponding to the operation information by an electromagnetic force, and hence achieves the on/off of the illuminating lamp and the projection lamp. In order to further reduce the probability of the bowing operation of the driver, for instance, the control module may also have the voice input function. That is to say, the driver gives out a voice instruction, for instance, the voice instruction may be "turning on navigation information", "turning off navigation information" or similar expression. A voice input module of the control module receives voice information, analyzes the voice information, and then executes corresponding operation. The implementation of analysis, for instance, may be that voice instructions are stored in a voice system of the control module in advance and correspond to corresponding operations. For instance, the voice instructions such as "navigation system" and "starting navigation system" are stored and correspond to an operation of projecting the navigation information onto the projection medium. The voice system may execute corresponding operation when receiving similar voice instruction from the driver. The user may set various voice instructions according to own habits. No further description will be given in the present disclosure.

In addition, the control module, for instance, is configured to provide the information to be projected such as navigation information, video information and image information. There are, for instance, two means of providing information for the projection lamp by the control module: one is to arrange a navigation system in the control module and provide navigation information of the navigation system to the projection lamp; and the other is to provide an information access interface so as to provide the information to be projected transmitted from the outside to the projection lamp.

It should be noted that the control module is not necessarily a component which is physically independent of the projection lamp, and may also be integrated with the projection lamp, or partially functions are integrated. For instance, when the projection lamp and the control module are completely integrated, an operation window relevant to the control module may be reserved. For instance, when the projection lamp and the control module are integrated, the obtained product may be fixed on an automobile through a housing; an opening may be reserved on the housing; the above information interface, for instance, may be exposed from the opening, so that an external information source can be connected with the interface; or the display, for instance, is exposed from the opening, so that the user can conveniently do relevant operations through the display. No restrictive interpretation should be given here by those skilled in the art.

Figure 2:
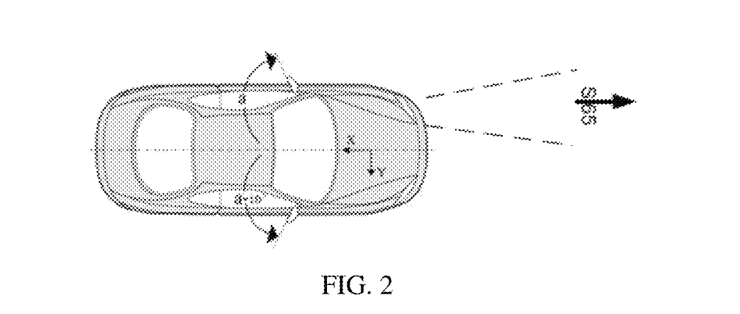
FIG. 2 is a schematic diagram illustrating the case that the car light system provided by the embodiment of the present disclosure is applied to a motor vehicle and displays one kind of navigation information.

FIG. 2 is a schematic diagram illustrating the case that the car light system provided by the embodiment of the present disclosure is applied to an automobile and displays one kind of navigation information. As shown in FIG. 2, for instance, the car light system of the automobile projects the navigation information onto the ground. For instance, as shown in the figure, the projection information projected to the ground is a straight arrow and S65. For instance, the straight arrow represents that the automobile goes straight, and S65 represents the current speed per hour, e.g., 65 m/s.

Figure 3:
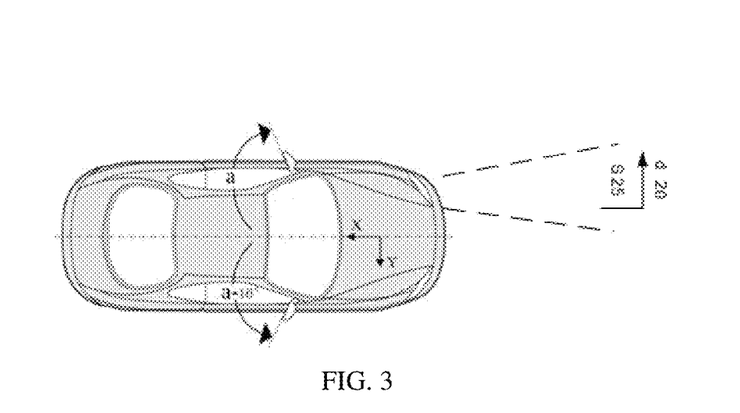
FIG. 3 is a schematic diagram illustrating the case that the car light system provided by the embodiment of the present disclosure is applied to the motor vehicle and displays another kind of navigation information.

FIG. 3 is a schematic diagram illustrating the case that the car light system provided by the embodiment of the present disclosure is applied to the automobile and displays another kind of navigation information. As shown in FIG. 3, for instance, the car light system of the automobile projects the navigation information onto the ground. For instance, as shown in the figure, the projection information projected onto the ground is a turn-left arrow and S25. For instance, the turn-left arrow represents that the automobile turns left, and S25 represents the current speed per hour, e.g., 25 m/s.

FIGS. 2 and 3 simply demonstrate the projection effect of the car light system. It should be noted that the projectable information of the car light system is not limited thereto.

In one embodiment, the car light system further comprises a lampshade, and the illuminating lamp and the projection lamp are disposed in the lampshade. As the illuminating lamp and the projection lamp are disposed in the lampshade, the illuminating lamp and the projection lamp can be effectively protected and prevented from being damaged.

In one embodiment, the projection lamp may be rotatably disposed in the lampshade. For instance, the projection lamp is arranged through a rotatable base. For instance, one end of the base may be a fixing part and the other end may be a rotating part which is connected with the fixing part and may rotate relative to the fixing part after connection. The projection lamp is fixedly connected with the rotating part and hence can rotate along with the rotating part. As the projection lamp is rotatably arranged, the projection angle of the projection lamp can be automatically adjusted, so that it is ensured that the driver can clearly observe the projection information, for instance, the navigation information, on the premise of safe driving.

In one embodiment, the illuminating lamp includes a light-emitting part, and a light adjuster is disposed on a light-emitting side of the light-emitting part and configured to adjust the direction of light emitted by the light-emitting part. For instance, as described above, the light adjuster may also be disposed in the lampshade. By arrangement of the light adjuster, high and low beam illumination can be simultaneously achieved through one illuminating lamp, so the structure is simplified and the cost is reduced.

It should be noted that the light adjuster, for instance, may adjust the distance and the intensity of the light emitted by the illuminating lamp by changing the direction of the light emitted by the light-emitting part of the illuminating lamp, and hence achieves the function of high and low beams.

In one embodiment, the light adjuster is configured to switch between a first state and a second state; in the first state, the light adjuster diverges the light emitted by the light-emitting part; and in the second state, the light emitted by the light-emitting part has unchanged direction when running through the light adjuster. For instance, the switching of the light adjuster between the first state and the second state may be achieved by manual switching. Manual switching is relative to automatic switching, namely the user can determine whether to allow the light adjuster to be in the first state or the second state according to the external environment. For instance, as for a polymeric dispersion liquid crystal device or a multistable liquid crystal device as described below, the switching between two states may be achieved by changing electrical fields applied thereto. For instance, as for a deformable lens, the user may determine whether to apply an acting force to allow the lens to achieve the switching between the planar state and the concave state or the convex state according to the external environment, so that the adjusting function of the light adjuster on the light can be changed.

Figure 4:
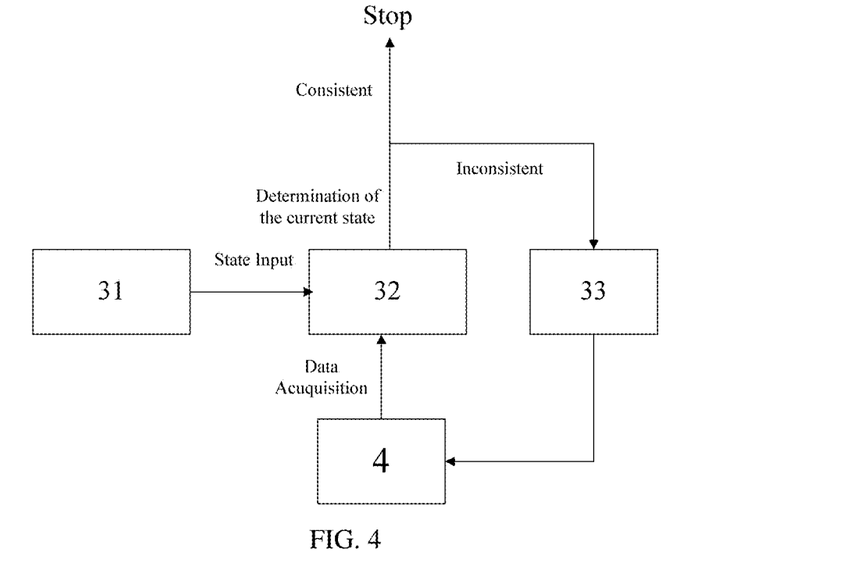
FIG. 4 is a logic diagram illustrating the case that a control module in the embodiment of the present disclosure controls a light adjuster to achieve state switching.

In one embodiment, the light adjuster is connected to the control module, and the control module controls the light adjuster to switch between the first state and the second state. As the control module is adopted to control the switching of the light adjuster between the first state and the second state, the transition between high and low beams can be conveniently achieved. FIG. 4 is a logical diagram illustrating the case that the control module in the embodiment of the present disclosure controls the switching of the light adjuster. As shown in FIG. 4, for instance, the control module 3 includes an input unit 31, a processing unit 32 and an execution unit 33. The input unit 31 is configured to input an operation instruction and transmit the instruction to the processing unit; the processing unit 32 is configured to analyze the inputted instruction and generate an executable operation instruction; and the execution unit 33 is configured to operate according to the operation instruction, so as to achieve the switching of a light adjuster 4 between two states.

The input unit 31, for instance, may be a voice recognition device. A voice instruction given out by the user may be transmitted to the processing unit 32 through the voice recognition device. As described above, the user may automatically set the use of which kind of voice instruction according to own habits. For instance, "1" corresponds to the first state of the light adjuster, and "2" corresponds to the second state of the light adjuster. Or other voice instructions are adopted to correspond to the two states of the light adjuster 4. In addition, the input unit 31 may also input the operation instruction by means of Chinese character input. For instance, the input unit 31 includes a handwriting screen. When the user hopes that the light adjuster 4 be switched to the first state, the number "1" may be inputted; and when the user hopes that the light adjuster 4 be switched to the second state, the number "2" may be inputted. Other input modes may also be adopted.

The processing unit 32 analyzes the operation instruction after receiving the operation instruction inputted by the input unit 31, for instance, when receiving information of the voice "1" or the number "1", may acquire data about the state of the light adjuster 4 at first and then determine the state. If the current state of the light adjuster 4 is the first state, no operation is executed, namely a stop operation in the block diagram is executed; and if the current state of the light adjuster 4 is the second state, namely is inconsistent with the state inputted by the input unit 31, an instruction for switching the light adjuster 4 to the first state is sent to the execution unit 33. The execution unit 33 achieves the switching of the light adjuster 4 from the second state to the first state according to the instruction.

The execution unit, for instance, may be a dynamic structure connected with the light adjuster. For instance, the dynamic structure may be a gear transmission mechanism driven by an engine. A gear, for instance, may apply an acting force to the light adjuster through a worm, a spring or a belt, and the switching of the state of the light adjuster is achieved by changing the structure of the light adjuster. For instance, as for a deformable lens, worms on both sides of the lens may be adopted to apply pressure or tension (for instance, the head of the worm may be provided with a retractable sucker) to allow the lens to switch among a convex lens, a concave lens and a planar lens. For instance, the motion of the two worms may be achieved by the above transmission mechanism. For instance, the two worms may do translation along respective axis directions, so as to perform an operation such as extrusion and extension on the lens.

It should be noted that the light adjuster in the embodiment of the present disclosure, for instance, is used for adjusting the propagation direction of the light running through the light adjuster. The light adjuster, for instance, may be a polymeric dispersion liquid crystal device, a multistable liquid crystal device or the lens as described below. As for this kind of optical elements, for instance, the influence of the optical element on the light propagation direction may be changed by changing the structure thereof.

Figure 5A:
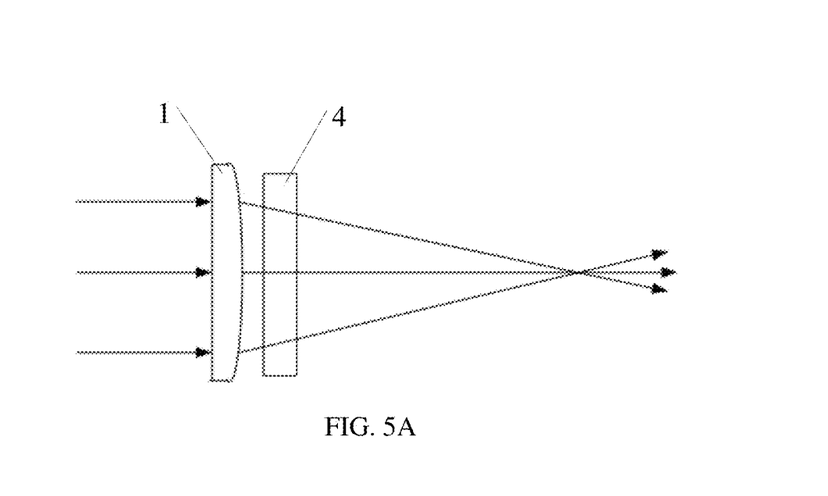
FIG. 5A is a schematic diagram illustrating the case that the light adjuster in the embodiment of the present disclosure is in the first state and diverges light of an illuminating lamp.
Figure 5B:
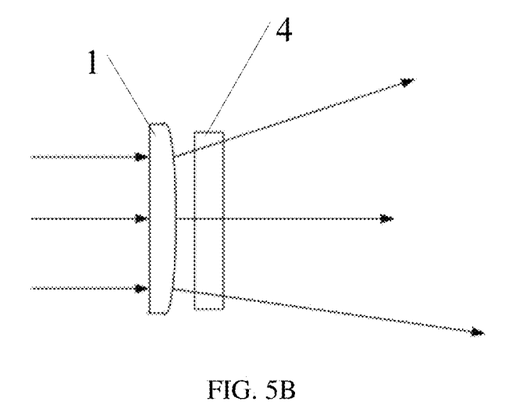
FIG. 5B is a schematic diagram illustrating the case that the light adjuster in the embodiment of the present disclosure is in the second state and does not affect the light direction of the illuminating lamp.
Figure 5C:
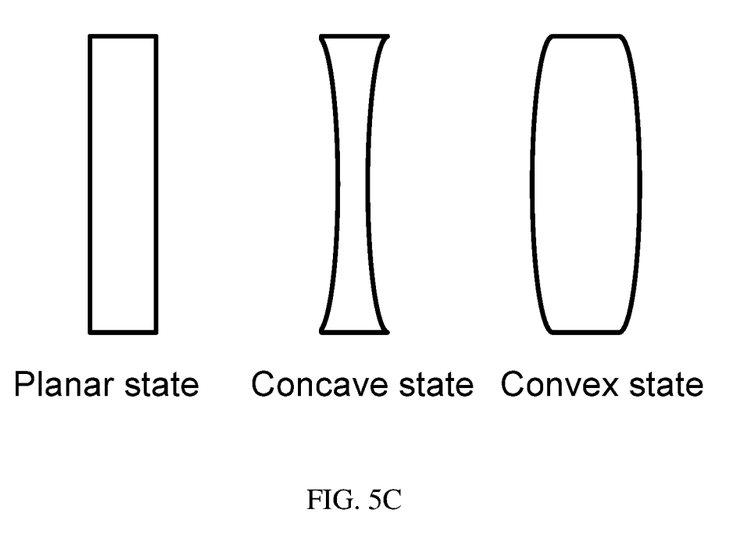
FIG. 5C is a schematic diagram showing different states of an adjustable lens.

In one embodiment, for instance, the light adjuster is a polymeric dispersion liquid crystal device or a multistable liquid crystal device. FIG. 5A is a schematic diagram illustrating the case that the light adjuster in the embodiment of the present disclosure is in the second state and does not affect the light direction of the illuminating lamp, and FIG. 5B is a schematic diagram illustrating the case that the light adjuster in the embodiment of the present disclosure is in the first state and diverges the light of the illuminating lamp. As shown in FIGS. 5A and 5B, the light adjuster 4 is disposed on the light-emitting side of the illuminating lamp 1. For instance, the light adjuster is a polymeric dispersion liquid crystal device or a multistable liquid crystal device. The polymeric dispersion liquid crystal device or the multistable liquid crystal device includes two states, namely transparent state and scattering state. As shown in FIG. 5A, the polymeric dispersion liquid crystal device or the multistable liquid crystal device is in the transparent state, and the light emitted by the illuminating lamp may maintain the original direction and achieve high beam illumination. As shown in FIG. 5B, the polymeric dispersion liquid crystal device or the multistable liquid crystal device is in the scattering state, and the light emitted by the illuminating lamp 1 is scattered and achieves low beam illumination.

In one embodiment, the light adjuster is an adjustable lens. The adjuster lens includes three states, planar state, concave state and convex state, so as to transmit, diverge and focus the light emitted by the light-emitting part. For instance, the adjustable lens is composed of two flexible light-transmitting sheets which are opposite to each other and can be deformed. When both the two flexible light-admitting sheets are planar structures, the formed adjustable lens is in the planar state, and at this point, the light emitted by the illuminating lamp may propagate according to the original direction after running through the adjustable lens; when the two flexible light-admitting sheets are combined to form a concave-convex structure and form the adjustable lens by having the convex surfaces face each other, the adjustable lens is a convex lens, and at this point, the light emitted by the illuminating lamp is focused after running through the adjustable lens, so that the brightness can be improved; and when the two flexible light-admitting sheets are combined to form a convex-convex structure and form the adjustable lens by having convex surfaces face each other, the adjustable lens is a concave lens, and in this case, the light emitted by the illuminating lamp is diverged after running through the adjustable lens, so that the light can have small irradiation distance and large illumination area. As described above, the state switching of the lens may be manually achieved or implemented by the control module. No further description will be given here in the present disclosure.

In one embodiment, the projection medium is the ground. For instance, the distance from a projection position on the ground to the projection lamp may be 1-5 m, e.g., 2-4 m, so that the driver can clearly observe the projection information on the ground.

In one embodiment, a navigation system is integrated into the control module, and the navigation information may be projected onto the projection medium through the projection lamp. As the navigation system is integrated into the control module, the car light system has richer functions, and meanwhile, is not required to be connected with an external navigation system, and hence simplifies the structure and improves the availability.

In one embodiment, the playback function of videos, audios and images is integrated into the control module, and the videos and the images are projected onto the projection medium through the projection lamp. As a plurality of functions are integrated into the control module, the car light system can have richer functions, and meanwhile, is not required to be connected with an external navigation system, and hence simplifies the structure and improves the availability.

In one embodiment, the control module includes an interface which is configured to connect an information source to be projected. As the control module is provided with the interface, various kinds of information to be projected can be conveniently projected and displayed, so that the application range of the car light system can be expanded. For instance, navigation software of a mobile phone has real-time update function. For instance, the navigation software of the mobile phone may display the jam situation of the road in real time, so that the driver can choose a better route according to the jam situation. But when the driver looked down at the phone, there is also a big security risk. The car light system projects the navigation information of the mobile phone to, for instance, the ground, and hence can provide an optimum navigation route for the driver on the premise of ensuring safe driving.

Another aspect of the present disclosure provides a motor vehicle, which comprises the car light system. The motor vehicle also has the above technical effects by adoption of the above car light, and may refer to the foregoing description.

In addition, when the car light system is applied to the motor vehicle, the illuminating lamp and the projection lamp of the car light system, for instance, may be disposed on the front of the motor vehicle. For instance, as for an automobile, the illuminating lamp and the projection lamp may be disposed on both sides of the front end of the automobile (namely disposed at usual setting positions of car lights in the current automobile), and the control module, for instance, may be disposed in a cab of the automobile, so as to provide convenience for the operation of the driver. No limitation will be given here in the present disclosure.

In one embodiment, the motor vehicle comprises a recess disposed at a head position of the motor vehicle, a receiving screen matched with the recess, and a pop-up reset mechanism, wherein the pop-up reset mechanism is configured to pop up and reset the receiving screen; in the process of pop-up, the receiving screen is disposed at a position facing the light-emitting part of the projection lamp on front of the motor vehicle; and in the process of reset, the receiving screen is retracted into the recess. The front here refers to a position away from the head of the motor vehicle, in the direction from the rear of the motor vehicle to the head. For instance, the recess may be disposed between the car light (e.g. the projection lamp) of the motor vehicle and a chassis in the direction perpendicular to the chassis of the motor vehicle. For instance, the recess is extended from the front of the motor vehicle to the rear of the motor vehicle along the direction basically parallel to the chassis of the motor vehicle. For instance, the distance from the position to the head of the motor vehicle is 0-5 m, e.g., 0-3 m. When the receiving screen pops up, information such as videos, images and news is projected onto the receiving screen by the projection lamp. The motor vehicle adopts the above structure and hence can provide convenience for the driver to enjoy the information such as the videos, the images and the news on the premise of not affecting the use of the motor vehicle.

In one embodiment, for instance, the receiving screen is just opposite to the projection lamp in the case of pop-up; and the projection lamp projects the projection information onto the receiving screen. The opposite arrangement of the receiving screen and the projection lamp improves the projection display effect.

In one embodiment, for instance, when the receiving screen is in the pop-up state, the distance between the projection lamp and the receiving screen is 2-5 m. The display effect of the information to be projected can be improved by the setting of the distance between the projection lamp and the receiving screen.

In one embodiment, for instance, the recess is a structure extended from the head of the automobile to the rear, for instance, the recess may be basically parallel to the chassis of the automobile.

Figure 6:
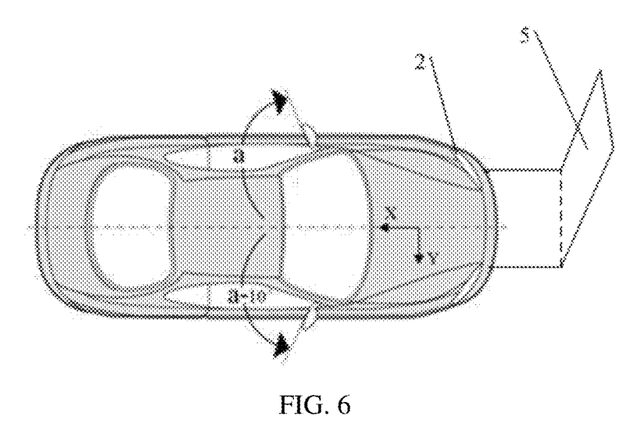
FIG. 6 is a schematic structural view illustrating the case that a motor vehicle employing the car light system provided by the embodiment of the present disclosure is provided with a receiving screen.

FIG. 6 is a schematic structural view illustrating the case that the automobile employing the car light system provided by the embodiment of the present disclosure comprises the receiving screen. As shown in FIG. 6, the receiving screen 5 of the automobile is disposed at a position facing the light-emitting part of the projection lamp 2 on front of the motor vehicle after pop-up. The driver can project the information to be projected such as the video onto the receiving screen 5.

Figure 7A:
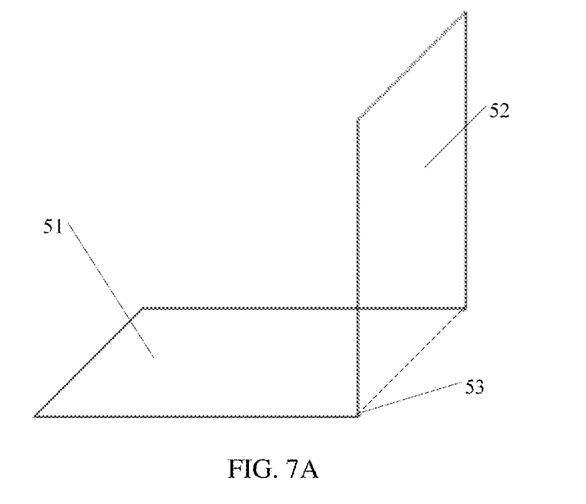
FIGS. 7A and 7B are schematic structural views of the receiving screen in the embodiment of the present disclosure.
Figure 7B:
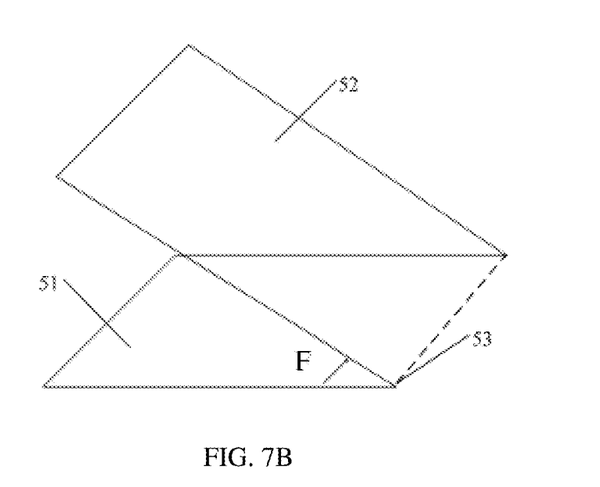

The pop-up of the receiving screen as shown in FIG. 6, for instance, may be achieved by the following means: as shown in FIGS. 7a and 7b, for instance, a screen is divided into a gathering portion 51 and a receiving portion 52 (corresponding to the receiving screen), and the gathering portion 51 and the receiving portion 52 are connected with each other through a connecting mechanism 53 (FIG. 7a is a schematic diagram obtained after the receiving portion is popped up in place, and FIG. 7b is a schematic diagram when the receiving portion is in one state of the pop-up process). For instance, the connecting mechanism may be a spring, a coil spring, a hinge, etc. For instance, when the connecting mechanism 53 is a spring, in the folding state or in the pop-up process, the receiving portion is applied with an acting force of the spring (the arrow as shown in FIG. 7b indicates the stress condition when the receiving portion is in one state of the pop-up process), and is prone to be restored to be basically perpendicular to the gathering portion. For instance, the receiving portion and the gathering portion folded together are disposed in the recess of the automobile. At this point, the receiving portion is in the folding state due to the limitation of an inner wall of the recess of the automobile away from the ground. When the receiving portion and the gathering portion folded together move out of the recess, the receiving portion is popped up due to the action of a restoring force of the spring, and hence is in the state as shown in FIG. 6.

In one embodiment, for instance, the motion of the receiving screen (corresponding to the receiving portion) in the recess may be achieved by the cooperation between a slide rail and a roller. For instance, the pop-up reset mechanism, for instance, includes a slide rail disposed in the recess, and a roller matched with the slide rail is, for instance, disposed on one surface of the gathering portion away from the receiving portion. Thus, the gathering portion can drive the receiving screen to move along the slide rail when applied with an external force.

In one embodiment, for instance, the pop-up of the receiving screen may also be achieved by the rotation of partial slide rail. For instance, the slide rail may be divided into a fixed section and a rotatable section; the fixed section is fixed in the recess; and the rotatable section is rotatably connected with the fixed section. The motion process of the receiving screen is as follows: the receiving screen is pulled to move along the fixed section of the slide rail; when the roller exceeds the fixed section, the rotatable section of the slide rail rotates; and hence the screen is adjusted from the state basically parallel to the chassis to the state facing the light-emitting part of the projection lamp.

The retracting of the receiving screen into the recess, for instance, may be completed by manual or mechanical means. The retracting process is opposite to the above process. No further description will be given here.

The above embodiments may be mutually combined and have better technical effects.

Many functional components described in the Description are all referred to as modules or units, so as to more particularly emphasize the independence of the implementation thereof.

In the embodiment of the present disclosure, the module or unit may be implemented by software, so as to be executed by various types of processors. For example, an identified executable code module may include one or more physical or logical blocks of a computer instruction, and may, for instance, be constructed as an object, a process, or a function. In spite of this, executable codes of the identified module do not need to be physically located together, but may include different instructions stored in different physical blocks. When logically combined, these instructions constitute a module and achieve the specific purpose of the module.

In practice, the executable code module may be a single instruction or a plurality of instructions, and may even be distributed over a plurality of different code segments, distributed among different programs, or distributed across multiple memory devices. Similarly, operating data may be identified within the module or unit and may be implemented in any suitable form and organized within any suitable type of data structure. The operating data may be collected as a single data set or may be distributed at different positions (including different storage devices) and may at least partially exist only as electronic signals on a system or network.

When the module or unit can be implemented by software, taking into account the level of existing hardware technology, as for the module capable of being implemented by software, corresponding hardware circuit may be established by those skilled in the art to achieve corresponding function without considering the cost. The hardware circuit includes the conventional very large scale integration (VLSI) circuit or a gate array and the conventional semiconductor devices such as a logic chip and a transistor or other discrete components. The module or unit may also be implemented by a programmable hardware device such as a field programmable gate array, a programmable logic array and a programmable logic device.

The terms "first", "second" and the like used in the text are only used for distinguishing one entity or operation with another entity or operation and do not indicate or imply any relationship or sequence between the entities or operations. The term "comprise", "include" or the like is an open expression and does not exclude that the included process, method or article also includes other elements. It should be also noted that the orientation or position relationship indicated by "on", "beneath" or the like is an orientation or position relationship as shown in the accompanying drawings, is only for the objective of convenient description of the present disclosure and simple description, and does not indicate or imply that the referred device or element must have specific orientation and be constructed and operated at specific orientation, and hence should not be construed as the limitation of the present disclosure. Unless otherwise specified, the terms "mounted", "connected" and "connection" shall be broadly understood, for instance, may be fixed connection and may also be detachable connection or integral connection; may be mechanical connection and may also be electrical connection; may be direct connection and may also be indirect connection via an intermediate medium; or may be the internal communication of two elements. The specific meanings of the above terms in the present disclosure shall be understood by those skilled in the art according to specific conditions.

The foregoing is only the preferred embodiments of the present disclosure and not intended to limit the scope of protection of the present disclosure. The scope of protection of the present disclosure should be defined by the appended claims.

The application claims priority to the Chinese patent application No. 201610279970.9, filed Apr. 28, 2016, the disclosure of which is incorporated herein by reference as part of the application.

The invention claimed is:

1. A car light system, comprising:
   an illuminating lamp configured to emit illuminating ray;
   a light adjuster configured to adjust a direction of light emitted by the illuminating lamp;
   a projection lamp configured to project received information to be projected onto a projection medium; and
   a control module configured to provide the information to be projected and turn on and off the illuminating lamp and the projection lamp,
   wherein the light adjuster is a polymeric dispersion liquid crystal device or a multistable liquid crystal device, the light adjuster is configured to switch between a first state and a second state; in the first state, the light adjuster is configured to be in a scattering state to diverge the light emitted by the illuminating lamp; and in the second state, the light emitted by the illuminating lamp has unchanged direction upon running through the light adjuster.

2. The car light system according to claim 1, further comprising a lampshade, wherein the illuminating lamp and the projection lamp are disposed in the lampshade.

3. The car light system according to claim 1, wherein the light adjuster is connected to the control module; and the control module controls the light adjuster to switch between the first state and the second state.

4. The car light system according to claim 1, wherein the projection medium is the ground.

5. The car light system according to claim 1, wherein the control module integrates a navigation function; and navigation information is projected onto the projection medium through the projection lamp.

6. The car light system according to claim 1, wherein the control module integrates a playback function of videos, audios and images; and the videos and the images are projected onto the projection medium through the projection lamp.

7. The car light system according to claim 1, wherein the control module includes an interface which is configured to connect an information source to be projected.

8. A motor vehicle, comprising the car light system according to claim 1.

* * * * *